United States Patent [19]

Games et al.

[11] 3,851,159

[45] Nov. 26, 1974

[54] ELECTRONIC WAYPOINT BEARING CONVERTER

[75] Inventors: John E. Games, Granby; Clarence Casper, Jr., Windsor, both of Conn.

[73] Assignee: United Aircraft Corporation, East Hartford, Conn.

[22] Filed: Aug. 2, 1973

[21] Appl. No.: 385,204

[52] U.S. Cl... 235/150.27, 235/150.26, 340/27 NA, 343/106 R
[51] Int. Cl. .............................................. G01s 3/04
[58] Field of Search....... 235/150.2, 150.26, 150.27; 343/106; 340/25–27

[56] References Cited
UNITED STATES PATENTS

| | | | |
|---|---|---|---|
| 3,460,146 | 8/1969 | White et al. | 340/27 NA |
| 3,644,928 | 2/1972 | Wright | 343/106 R |
| 3,652,837 | 3/1972 | Perkins | 235/150.27 |
| 3,659,291 | 4/1972 | Anthony | 343/106 R |

Primary Examiner—Felix D. Gruber
Attorney, Agent, or Firm—M. P. Williams

[57] ABSTRACT

Signals comprising 30 Hz north reference and 30 Hz distance to way point vectors derived from an area navigation computer are utilized to generate a count equivalent to the true bearing (relative to north) of a way point from an aircraft. The count is used to preset a down counter operated at 400 Hz, thereby to derive in-phase and quadrature signals at 400 Hz, the phase of which are indicative of the true bearing of a way point. These signals are combined in synchronous demodulators with converted compass gyro signals at 400 Hz, and the outputs of the synchronous demodulators are summed with various positive and negative scale factors so as to generate synchro driving signals equivalent to the relative bearing of the way point with respect to the aircraft heading, thereby to drive a way point bearing indicator relatively with respect to a compass card of an RMI indicator.

6 Claims, 3 Drawing Figures

ELECTRONIC WAYPOINT BEARING CONVERTER

CROSS REFERENCES TO RELATED APPLICATIONS

The disclosed apparatus may operate, for instance, in conjunction with and in response to signals provided by apparatus disclosed in a commonly owned, copending application entitled AREA NAVIGATION computer, Ser. No. 367,070, filed on June 4, 1973 by John E. Games et al. and directional gyro compass apparatus of the type disclosed in a commonly owned copending application entitled SYNCHRO DIGITIZER, Ser. No. 270,351, filed on July 10, 1972 by John E. Games et al, a continuation of Ser. No. 95,167, filed on Dec. 4, 1970, now abandoned.

BACKGROUND OF THE INVENTION

1. Field of Invention

This invention relates to RMI indicators, and more particularly to an electronic RMI converter.

2. Description of the Prior Art

It is traditional to provide a pointer on an aircraft heading compass card, referred to as an RMI (which originally means Radio Magnetic Indicator). As the aircraft heading varies, the compass card rotates so that the stationary heading pointer indicates the heading of the aircraft on the compass card. As is known, area navigation computers provide vectors equivalent to the distance and the true bearing of the way point from an aircraft. This is achieved by utilizing electronically derived distance and heading signals with respect to groundbased VOR/DME radio navigation stations to derive a vector of the aircraft to the ground station, together with preselected signals indicative of the vector of a desired way point with respect to the same ground station. Summation and rate filtering provides the desired vector of distance and bearing of the way point from the aircraft.

In order to indicate the bearing of the way point with respect to true north on the compass card, it is necessary to determine the bearing of the way point with respect to the aircraft heading since the compass card itself is rotated with respect to the aircraft heading. Stated alternatively, since the RMI card turns as the aircraft turns, it is necessary to get the way point bearing pointer to turn commensurately as the aircraft turns, thereby to maintain the way point true bearing on the turning RMI card. Traditionally, this has been achieved by gear trains and synchros which provide suitable mechanical alignment to subtract the aircraft heading angle from the way point true bearing angle to derive the way point relative bearing angle with respect to the aircraft heading.

Typically, a motor and a gear train are mechanically connected to a differential synchro which is positioned as a function of the aircraft heading, and another input to the differential synchro is the aircraft bearing to the way point so as to provide on a second set of windings the bearing of the way point relative to the heading of the aircraft. Naturally, all of this apparatus must be compatible, and it is rather expensive, as well as being bulky and less accurate than is desired.

SUMMARY OF INVENTION

The object of the present invention is to provide an electronic waypoint bearing indicator converter which electronically interfaces between an area navigation computer and a waypoint bearing indicator so as to provide waypoint bearing indicator drive signals indicative of the relative way point bearing with respect to the heading of the aircraft.

According to the present invention, electronic signals having electrical phase indicative of the true bearing of the way point are combined trigonometrically with electronic signals indicative of aircraft heading so as to provide signals relating to trigonometric combinations thereof which will drive a waypoint bearing indicator pointer as a function of relative way point bearing with respect to aircraft heading. In further accord with the present invention, signals from an area navigation computer at one frequency are combinable with signals representing aircraft heading at a different frequency by converting one of the sets of signals to the frequency of the other set prior to generating further signals as a combination thereof. In still further accord with the present invention, way point true bearing signals and aircraft heading signals, all at the same frequency, are combined in synchronous demodulators so as to provide synchro driving signals for driving a way point bearing pointer as a function of the relative bearing thereof with respect to aircraft heading.

The present invention eliminates the need for differential resolvers, differential synchros, and the like, thereby avoiding all of the inherent disadvantages of gear trains and electromechanical apparatus. The invention is capable of simple inplementation utilizing technology and apparatus which is well known and readily available. The invention provides inherently more accurate, more compact and lighter equipment, which can be produced at a substantial saving with respect to the prior art, for driving a way point bearing indicator with respect to a heading card in a waypoint bearing indicator apparatus.

The foregoing and various other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
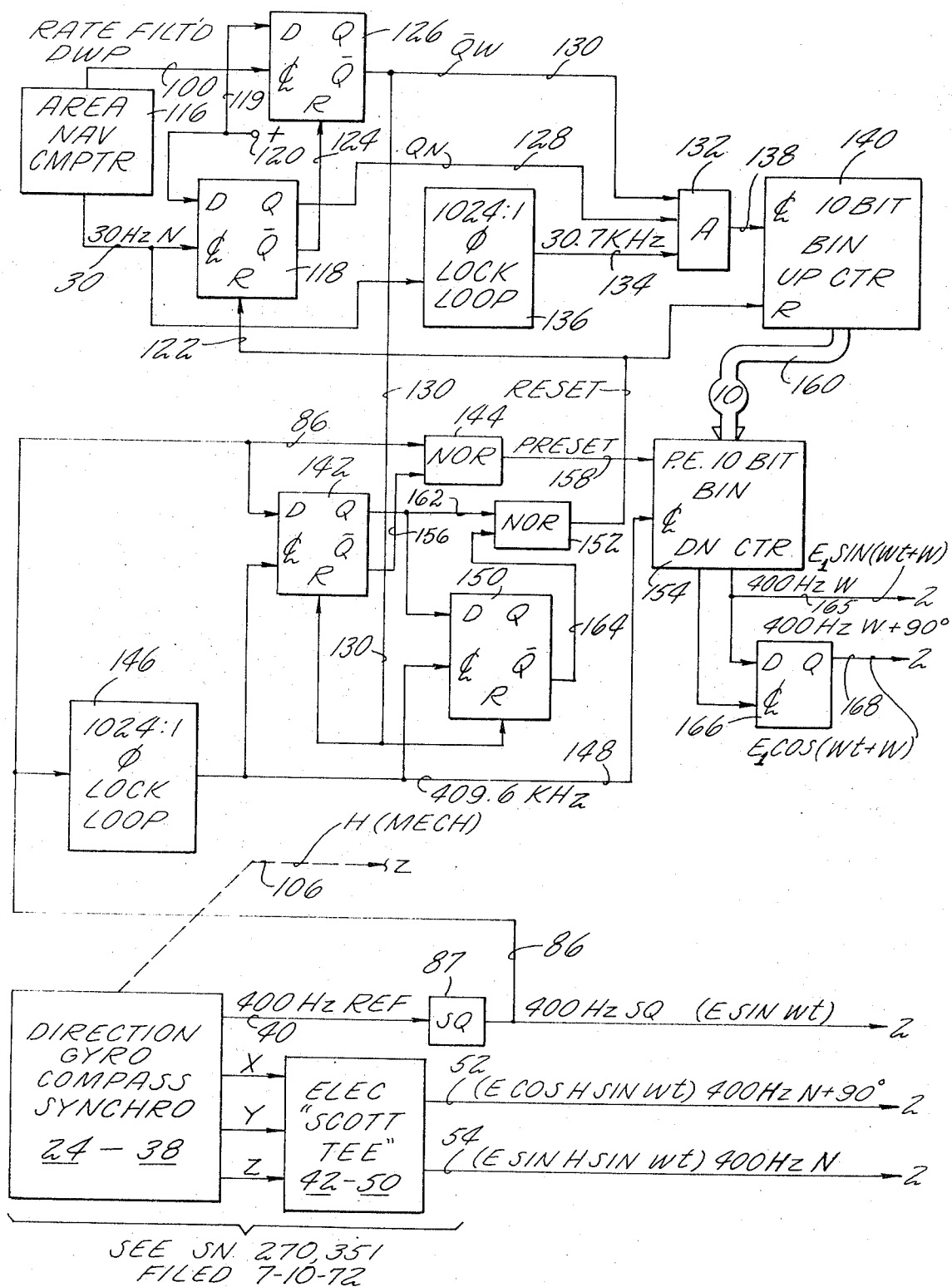
FIG. 1 is a schematic block diagram of apparatus for converting 30 Hz area navigation way point signals to 400 Hz, and for deriving 400 Hz signals indicative of aircraft heading in accordance with one embodiment of the invention.
Figure 2:
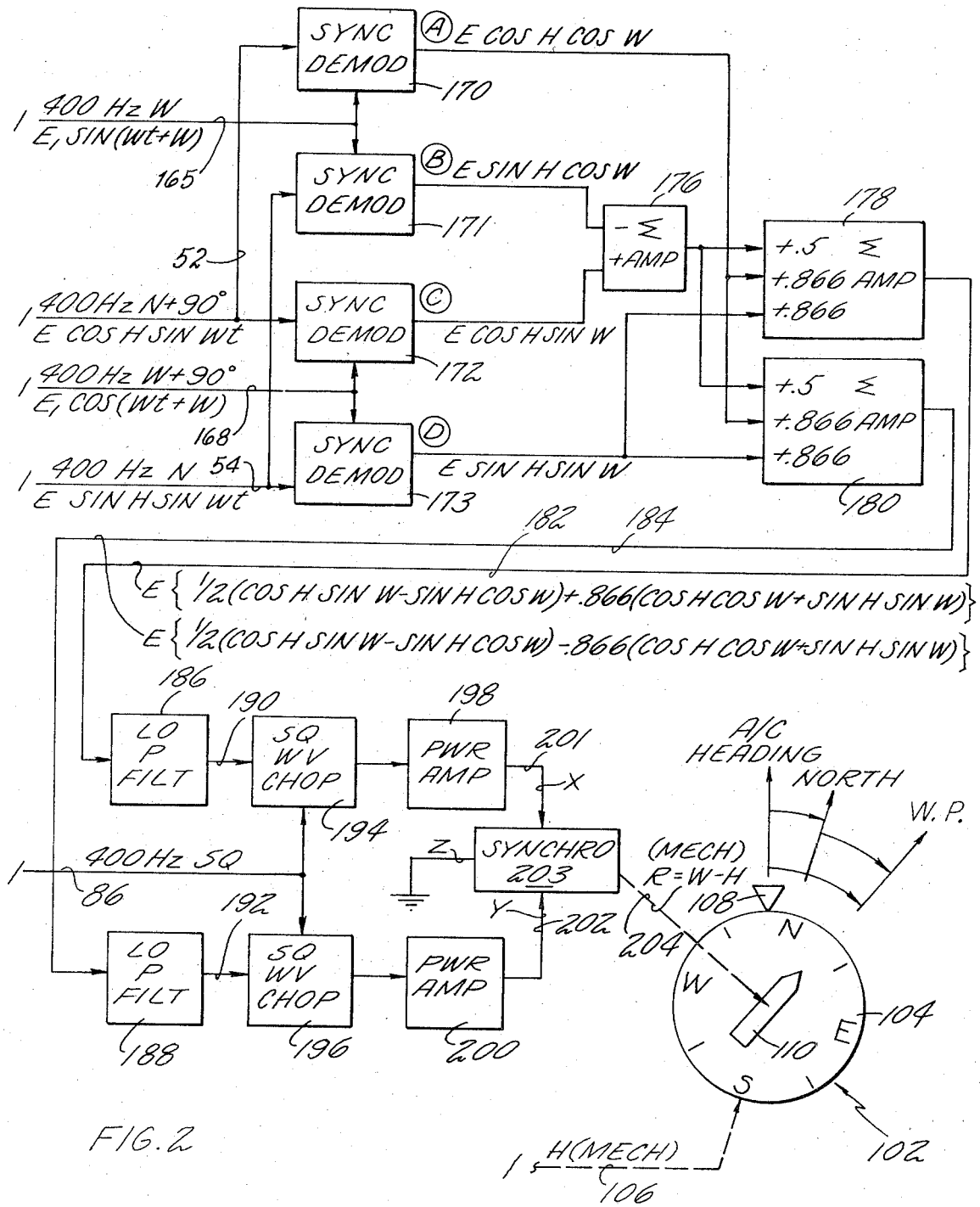
FIG. 2 is a schematic block diagram of apparatus for combining 400 Hz area navigation signals and 400 Hz aircraft heading signals so as to derive signals for operating a waypoint bearing indicator synchro as a function of relative bearing of the way point with respect to aircraft heading.

Referring to the bottom of FIG. 2, a waypoint bearing indicator 102 includes a compass card 104 which is driven mechanically (as illustrated by dashed line 106) by a suitable compass, such as a directional gyro compass (as described more fully with respect to FIG. 1 hereinafter), such that, as the card 104 turns in response to changes in the aircraft heading, the heading of the aircraft is indicated by a stationary aircraft heading pointer 108. A second pointer 110 is free to rotate independently of the compass card 104 and indicates on the card 104 the true bearing of a way point with respect to the aircraft. As described hereinbefore, since the compass card is turning with aircraft heading, the way point bearing indicator 110 must also turn with aircraft heading, as well as with changes of the position of the aircraft with respect to the way point, so that the true bearing of the way point with respect to north will be indicated on the card 104. In other words, it is necessary that the pointer 110 be driven as a function of the relative bearing (R) of the way point with respect to the aircraft heading (H) in order to indicate the true bearing of the way point (W) on the card 104. In order to drive the bearing indicator 110 with a well known synchro having X, Y and Z inputs thereto, where the X and Y signals are 120° out of phase with each other, it is necessary to provide signals containing relative bearing information, as follows:

1. $E_x = E \sin [(W - H) + 60°] \sin \omega t$
2. $E_y = E \sin [(W - H) - 60°] \sin \omega t$ where W and H are defined in FIG. 2, and $\omega t = 400$ Hz or other carrier of the synchro drive voltage.
Through the well known trigonometric conversions 3. $\sin (a + b) = \sin a \cos b + \cos a \sin b$
4. $\cos (a + b) = \cos a \cos b + \sin a \sin b$ equations (1) and (2) can be expanded as follows:

5. $E_x = E[\sin(W - H)\cos 60° + \cos(W - H)\sin 60°] \sin \omega t$
6. $\cos 60° = .5$
7. $\sin 60° = .866$
8. $E_x = E[.5 \sin(W - H) + .866 \cos(W - H)] \sin \omega t$ 9. $E_x = E[.5(\sin W \cos H - \cos W \sin H) + .866(\cos W \cos H + \sin W \sin H)] \sin \omega t$ and letting 10. $A = \cos H \cos W$
11. $B = E \sin H \cos W$
12. $C = \cos H \sin W$
13. $D = E \sin H \sin W$
14. $E_x = [.5(C - B) + .866 (A + D)] \sin \omega t$ and 15. $E_y = [.5(C - B) - .866 (A + D)] \sin \omega t$ In the present embodiment, the first step is to provide signals having the heading represented by a phase angle H, and signals having a phase angle W representing the true bearing to the way point, both at the same frequency so that the combination thereof as set forth in equations (14) and (15) may be readily accomplished. Referring to FIG. 1, an area navigation computer 116 may be of the form disclosed and claimed in the aforementioned commonly owned copending application entitled AREA NAVIGATION COMPUTER, Ser. No. 367,070, filed on June 4, 1973 by John E. Games et al. Alternatively, the area navigation computer 116 may comprise other forms of area navigation computers known in the art, so long as they provide the necessary signal inputs hereto. For instance, the area navigation computer of the aforementioned patent application provides in FIG. 1 thereof a 30 Hz north reference signal on a line 30, the phase of which is indicative of a reference to true north in the area navigation computer, as derived from the VOR ground station. The computer also provides a rate filtered distance to way point phasor on a line 100, the amplitude and phase of which are equivalent to the distance to the way point and the bearing of the way point with respect to north, respectively. The rate filtered distance to way point signal on the line 100 is similarly a 30 Hz signal. The signals on the line 30, 100 are preferably converted from sine waves to square waves by squaring circuits of the type known in the art (not shown), such as hard-limited, high gain amplifiers, as described in the aforementioned Games et al. application, Ser. No. 367,070. In order to combine these signals with signals at other frequencies, such as 400 Hz, which are typically more convenient for signals indicative of directional gyro compass settings, it is necessary to convert these signals to the frequency of the directional gyro compass (such as 400 Hz). Described briefly, the upper portion of FIG. 1 provides a count, to an up counter, which is a manifestation of the true bearing of the way point from north, and this is utilized in the central part of FIG. 1 as a preset which is operated on a 400 Hz basis to provide in-phase and quadrature signals related to 400 Hz north reference by the true bearing of the way point. The 30 Hz signals not only need to be converted to 400 Hz, but must be converted to 400 Hz with a 400 Hz phase which bears the correct relationship to the north reference of the 400 Hz, thereby to have the correct relationship with the directional gyro compass synchro output.

More specifically, with reference to FIGS. 1 and 3, a north flip flop 118 (which may typically comprise a standard D-type flip flop) has its D input continuously enabled by connection with a suitable voltage source, such as a positive source 120, so that it can be clocked ON whenever it is not forced into a reset state by a signal applied to its reset input over a line 122, the generation of which is described hereinafter. Whenever the north flip flop 118 is in its reset state, it provides at its not Q output a signal on a line 124 which forces the reset condition of a DWP flip flop 126. Thus the flip flop 126 is forced to the reset state whenever the flip flop 118 is forced to the reset state. Otherwise, since the D input of the DWP flip flop 126 is similarly connected by the line 119 to the positive source 120, it is free to be clocked into the set state by the DWP signal on the line 100 whenever its forced reset is removed. The flip flops 118, 126 are connected by a pair of lines 128, 130, respectively, to an AND circuit 132 which is also connected by a line 134 to the output of a phase locked loop 136 which has a 1024:1 countdown in it, so that in response to the 30 Hz north signal on the line 30, it will provide clocking signals at 30.7 Khz whenever the AND circuit 132 is enabled, the output of which is connected by a line 138 to the clock or count-advancing input of a ten bit binary counter 140. The counter 140 is also reset by the reset signal on the line 122.

In the middle portion of FIG. 1, a 400 Hz square wave signal on a line 86 is utilized to control a preset synchronizer including a D-type flip flop 142 and a NOR circuit 144. A phase locked loop 146 has a 1024:1 countdown therein and provides a 409.6 Khz signal on a line 148 which is accurately synchronized with respect to the 400 Hz north reference signal on the line 86. The preset synchronizer flip flop 142 controls a reset synchronizer including a D-type flip flop 150 and a NOR circuit 152. Both the preset and reset synchronizers, as well as a closed ring, ten bit binary down counter 154 are all controlled by the clock signals on the line 148.

Figure 3:
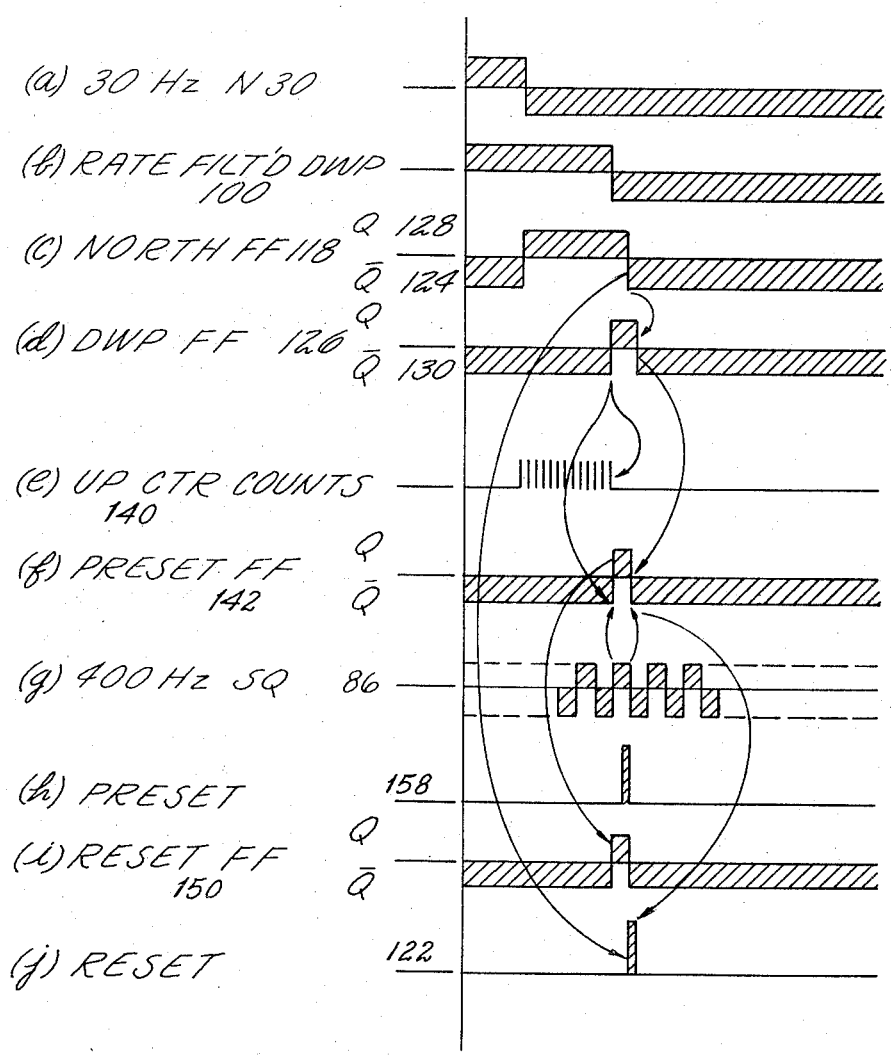
FIG. 3 is a plurality of illustrations on a common time base showing the timing of the apparatus of FIG. 1.

Operation of the apparatus of FIG. 1 is illustrated in FIG. 3. Therein, it is assumed that the way point is at some small angle with respect to north (as is illustrated in the bottom of FIG. 2). Therefore, the 30 Hz north reference signal on the line 30 will change from positive to negative slightly before the rate filtered DWP signal on the line 100 changes from positive to negative, as shown by illustrations a and b in FIG. 3. When the 30 Hz north reference goes negative, it clocks the north flip flop 118 causing it to assume the set state (illustration c) so that the Q output provides a signal on the line 128, and the not Q output no longer provides a signal on the line 124. This is assuming, as is verified hereinafter, that the reset signal on the line 122 is not present at this time. As soon as the Q output signal appears on the line 128, with the not Q output of flip flop 126 still available on the line 130, the AND circuit 132 passes clock signals from the line 134 over the line 138 to advance the count of the ten bit binary up counter 140, which has previously been reset (as is described hereinafter). The counting of the counter 140 continues until the rate filtered DWP signal on the line 100 goes negative, which causes setting of the DWP flip flop 126 (illustration d) so that the not Q signal on the line 130 disappears, thereby blocking the AND circuit 132. The counting of the counter is shown in illustration e of FIG. 3. The count itself (achieved at a multiple of 30 Hz) is a measure of the phase relationship between the 30 Hz north signal and the DWP signal, and therefore of the waypoint bearing. When the not Q signal on the line 130 disappears, it removes the forced reset to the preset flip flop 142 and the reset flip flop 150. Therefore, clock signals applied by the line 148 to the clock input of the preset flip flop 142 will begin to clock the flip flop 142 so that its Q output will follow the D input thereof. The D input in turn is connected to the 400 Hz squarewave signal on the line 86, so that the preset flip flop 142 follows the 400 Hz squarewave, thereby providing a reference to the 400 Hz utilized in the directional gyro compass as described hereinafter. Thus, if the 400 Hz squarewave happens to be negative at the instant that the reset is removed from the flip flops 142, 150 the next clock signal on the line 148 accomplishes nothing; however, once the 400 Hz squarewave does go positive, the very next clock signal on the line 148 will cause the preset flip flop 142 to become set as shown in illustration f of FIG. 3. When this happens, the not Q signal output of the flip flop 142 on a line 156 will disappear, so that when the 400 Hz squarewave signal on a line 86 goes negative, the NOR circuit 144 will generate a preset signal on a line 158, as shown in illustration h of FIG. 3. Due to the feedback relationships apparent in FIG. 1, this is a very narrow signal, depending only upon circuit propagation times. The preset signal on the line 158 causes the count in the ten bit binary up counter 140, which is present on a ten bit output bus 160, to be preset into the ten bit binary down counter 154.

At the same time that the not Q signal on the line 156 disappears thereby permitting generation of the preset signal on the line 158, the Q output of the preset flip flop 142 provides a signal on a line 162. This signal enables a D-type reset flip flop 150 so that the following clock signal on the line 148 will cause it to assume the set state, thereby causing a signal from its not Q output on a line 164 to disappear, as is shown in illustration i of FIG. 3. As soon as the 400 Hz signal goes negative, the very next clock signal on line 148 will cause the resetting of the preset flip flop 142 so that the Q output on line 162 disappears, causing a NOR circuit 152 to generate the reset signal on the line 122, as shown in illustration j of FIG. 3. This causes the ten bit binary up counter to be reset in anticipation of a further cycle, but more specifically forces the resetting of the north flip flop 118 thereby to continuously ensure blocking of the AND circuit 132 (which has been blocked due to the absence of the not Q signal on the line 130), and it also provides the signal on the line 124 to force the resetting of the DWP flip flop 126 so that the not Q signal on the line 130 does appear once again. Since these are forced resets not dependent upon clock inputs to the flip flops, there is merely circuit propagation time difference between the removal of the Q signal on the line 128 and the reappearance of the not Q signal on the line 130. However, the AND circuit 132 remains blocked nonetheless. The not Q signal on the line 130 forces the resetting of both the reset and preset flip flops 150, 142 as shown in illustrations f and i of FIG. 3, thereby returning the entire circuit to a quiescent condition, at which it will remain for the remainder of the period of the 30 Hz north signal (illustration (a) of FIG. 3).

In summation, the north flip flop 118 causes counting of the ten bit binary up counter to start, and the DWP flip flop 126 causes the counting of the ten bit binary up counter 140 to stop. When up counting is stopped, the ten bit binary down counter 154, which is operating on a 400 Hz reference, immediately has the preset enable appied thereto, so that no matter what count has been apparent within the counter 154, it is synchronized with the 400 Hz reference by the preset synchronizer 142, 144 at a gross value indicative of the true bearing of the way point from north as indicated by the preset count from the ten bit binary up counter 140 on the lines 160. Synchronizing to the 400 Hz north is achieved by the preset synchronizer 142, 144; then the down counter counts down to zero at a multiple of the 400 Hz signal, so its shift to the zero condition occurs at a time related to the count, and therefore related to the waypoint bearing. Thereafter, the circuit is returned to a quiescent condition for the remainder of the 30 Hz period by means of the reset synchronizer 150, 152, both synchronizers being returned to quiescent as soon as the DWP flip flop 126 is reset.

The circuitry of FIG. 1 described thus far is one aspect of the present invention. That is, using a count to transfer a phase related to 30 Hz to a phase related to 400 Hz; specifically, the lowest-ordered bit of the ten bit binary down counter 154 on a line 165 will transfer from a one to a zero at a time which relates to the 400 Hz reference square wave signal on the line 86 which is commensurate with the angle, W, of the true bearing of the way point with respect to north. A D-type flip flop 166 is clocked by the shift of the second from lowest-ordered output of the counter 154 to zero and enabled by the lowest-ordered output of the counter 154 being a ONE. The Q output of the flip flop 166 will provide, on a line 168, a signal which is 90° advanced from the signal on the line 165. The signals on the lines 165, 168 are utilized, as described with respect to FIG. 2 hereinafter, as reference inputs to four synchronous demodulators which combine the DWP true bearing signals with the aircraft heading signals so as to provide relative bearing signals for operating the indicator 110 as described hereinbefore.

As referred to briefly hereinbefore, the compass card 104 at the bottom of FIG. 2 is mechanically rotated as indicated by dashed line 106 in response to a directional gyro compass, which is illustrated in the bottom of FIG. 1. Therein, the reference numerals 24–38 denoting the directional gyro compass are the same as those relating to similar apparatus in the aforementioned commonly owned copending application entitled SYNCHRO DIGITIZER Ser. No. 270,351, filed on July 10, 1972 by J. E. Games et al, a continuation of Ser. No. 95,167, filed on Dec. 4, 1970, now abandoned. Such a synchro provides a three phase output denoted as X, Y and Z, as well as the mechanical output denoted by the dotted line 106. Electrical signals representative of the angle of the mechanical output (106) can be derived by means of an electronic Scott tee denoted by reference numerals 42–50 in said copending application, so as to provide signals on the lines 52, 54 which are in-phase and quadrature representations of the heading of the aircraft. These signals are of the form 16. $E_2 \cos H \sin \omega t$
17. $E_2 \sin H \cos \omega t$ These signals are combined with the DWP bearing signals on the lines 165 and 168 in synchronous demodulators, as shown in FIG. 2. As is known, synchronous demodulators having a signal input, $fs$, and a reference input, $fr$, provide an output which is dependent upon the relative functions of the input. Thus, when 18. $fs = A \cos s \sin \omega t$ and 19. $fr = B \sin (\omega t + r)$ then the demodulator output, N, is 20. $N = A \cos s \cos r$.

Similarly, when

21. $fs = A \cos s \sin \omega t$ and

22. $fr = B \cos (\omega t + r)$ then

23. $N = A \cos s \sin r$.

In other words, the amplitude is the product of the amplitude of the signal input and the sign of the phase of the signal input as related to the phase of the reference input. These relationships are utilized in a plurality of synchronous demodulators 170–173 as follows, respectively:

24. $E \cos H \sin \omega t$ demodulated by

25. $E_1 \sin (\omega t + W)$ yields

26. $A = E \cos H \cos W$.
27. $E \sin H \sin \omega t$ demodulated by

28. $E_1 \sin (\omega t + W)$ yields

29. $B = E \sin H \cos W$.
30. $E \cos H \sin \omega t$ demodulated by

31. $E_1 \cos (\omega t + W)$ yields

32. $C = E \cos H \sin W$.
33. $E \sin H \sin \omega t$ demodulated by

34. $E_1 \cos (\omega t + W)$ yields

35. $D = E \sin H \sin W$.

It is seen that equations (10)–(13) hereinbefore are equal to equations (26), (29), (32) and (35), respectively. Therefore, the combinations of the outputs of the synchronous demodulators as required in equations (14) and (15) will provide the desired input signals for a synchro to drive the way point bearing indicator 110, as described hereinbefore. The functions of equations (14) and (15) are provided in a straight-forward manner by summing amplifiers. A first summing amplifier 176 simply subtracts B from C and the other summing amplifiers 178, 180 provide the proper scale factors of +.5, +.866 and +.866, and of +.5, −.866 and −.866. This provides on a pair of lines 182, 184 the square bracketed portion of equations (14) and (15), so that all that remains is to impress this signal on a carrier wave ($\sin \omega t$). Because of the fact that there are harmonics present in the synchronous demodulator output, due to the square wave switching action thereof, the desired signals on the lines 182, 184 are applied to a pair of low pass filters 186, 188. The output of the filters 186, 188 on related lines 190, 192 are applied as signal inputs to square wave chopper circuits 194, 196, the control input to which is the 400 Hz squared signal on the line 86. This provides a square wave at 400 Hz, the amplitude of which is a slowly varying function of the relative bearing of the way point with respect to the aircraft heading. Although this is a square periodic wave, because of the highly inductive nature of synchros, there is no need to provide filtering for the removal of harmonic content prior to application of the signal to a synchro. However, if for any reason it is desired, the output of the choppers 194, 196 may be applied to related 400 Hz band pass filters. In this embodiment, however, these outputs are applied directly to power amplifiers 198, 200 the outputs of which on lines 201, 202 comprise the X and Y inputs to a synchro 203 which drives (as indicated by a dashed line 204) the way point bearing indicator 110. It should be noted that the $E_X$ signal on the line 201 would be precisely of the form of equation (9) if the harmonic content were filtered out, thereby rendering the signal on the line 201 sinusoidal, rather than of a squarewave form; similarly, with respect to the $E_y$ signal on the line 202. The 400 Hz squared signal on the line 86 is used as the carrier input to the choppers 194, 196 only for convenience; the carrier need not be at 400 Hz, but merely at any frequency compatible with the synchro 203; the phase can be arbitrary and unrelated to other phases in the circuitry.

Thus, although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. An electronic waypoint bearing indicator converter responsive to first input signals derived from an area navigation computer, indicative of true bearing of a way point, and second input signals derived from a directional gyro compass with respect to a synchro carrier signal, indicative of aircraft heading, to provide output signals indicative of relative way point bearing, said synchro carrier signal also being provided as an input to said converter, said converter comprising:

first electronic circuit means responsive to said first input signals and to said synchro carrier signal for providing first intermediate signals at the frequency of said synchro carrier signal and having a phase related to said synchro carrier signal in proportion to the true bearing of the way point as indicated by said first input signals;

second electronic means responsive to said second input signals for providing second intermediate signals at the frequency of said synchro carrier signal the magnitude of which varies as a function of the heading of said aircraft;

third electronic circuit means for combining said first intermediate signals and said second intermediate signals so as to provide a plurality of third intermediate signals, the magnitudes of which vary as a function of the heading of said aircraft and the phase of which vary from the phase of said synchro carrier signal as a function of the true bearing of the way point; and fourth electronic circuit means responsive to said third electronic circuit means for providing said output signals as a function of weighted sums and differences of said plurality of third intermediate signals.

2. An electronic converter according to claim 1 wherein said first electronic circuit means includes a first counter, a second counter having a plurality of selectively enabled preset inputs, said preset inputs being connected for response to the output of said first counter, means responsive to said first input signals for providing a count in said first counter proportional to the true bearing of the way point and providing an indication of when the count in said first counter is complete, means responsive to the indication of the count being complete to enable the preset inputs of said second counter, and means responsive to said synchro carrier signal for causing said second counter to count, said first intermediate signals being derived in response to high order outputs of said second counter.

3. An electronic converter according to claim 1 wherein said third electronic circuit means comprises a plurality of synchronous demodulators, the signal inputs of which are connected for response to said second intermediate signals, the reference inputs of which are connected for response to said first intermediate signals for demodulating said second intermediate signals in accordance with the phase of said first intermediate signals.

4. An electronic converter according to claim 3 wherein said first intermediate signals are of the form $E_1 \sin(\omega t + W)$
$E_1 \cos(\omega t + W)$, where $\omega$ relates to said synchro carrier signal, W is the phase proportional to said true bearing to the way point, and wherein said second intermediate signals are of the form $E \cos H \sin \omega t$
$E \sin H \sin \omega t$ where $E \sin H$ is the amplitude, E being an arbitrary maximum amplitude, and H being proportional to the aircraft heading, and wherein said third intermediate signals provided by said synchronous demodulators are of the form $A = E \cos H \cos W$
$B = E \sin H \cos W$
$C = E \cos H \sin W$
$D = E \sin H \sin W$, said output signals being of the form $E_x = [.5(C - B) + .866(A + D)] \sin \omega t$
$E_y = [.5(C - B) - .866(A + D)] \sin \omega t$.

5. An electronic converter according to claim 4 wherein said fourth electronic circuit means comprises a differencing amplifier to provide a signal C−B, and a pair of summation amplifiers, each having an input with the scale factor +.5 connected for response to said first summing amplifier, one of said second summing amplifiers having two inputs with scale factors +.866, one connected for response to the one of said synchronous demodulators providing said signal A, and the other connected for response to the one of said synchronous demodulators providing said signal D, said third synchronous demodulator having a pair of inputs with scale factors −.866, one connected to the one of said synchronous demodulators providing said signal A, and the other connected to the one of said synchronous demodulators providing said signal D; and means responsive to the output of said second and third summing amplifiers for providing said output signals on a periodic carrier wave.

6. An electronic converter according to claim 5 wherein said responsive means comprises a set of apparatus responsive to each of said second and third amplifiers, each set comprising a low pass filter feeding a square wave chopper the output of which feeds a power amplifier, the output of which comprise the desired output signals.

* * * * *